(12) United States Patent
Perry

(10) Patent No.: US 11,383,687 B2
(45) Date of Patent: Jul. 12, 2022

(54) BRAKE MASTER CYLINDER

(71) Applicant: Andrew James Perry, Palmdale, CA (US)

(72) Inventor: Andrew James Perry, Palmdale, CA (US)

(*) Notice: Subject to any disclaimer, the term of this patent is extended or adjusted under 35 U.S.C. 154(b) by 0 days.

(21) Appl. No.: 16/888,867

(22) Filed: Jun. 1, 2020

(65) Prior Publication Data

US 2020/0384971 A1 Dec. 10, 2020

Related U.S. Application Data

(63) Continuation of application No. 62/857,654, filed on Jun. 5, 2019.

(51) Int. Cl.
*B60T 13/14* (2006.01)
*B60T 7/10* (2006.01)
*B62L 3/02* (2006.01)

(52) U.S. Cl.
CPC .............. *B60T 13/142* (2013.01); *B60T 7/10* (2013.01); *B62L 3/023* (2013.01); *B62L 3/026* (2013.01)

(58) Field of Classification Search
CPC ............ F16D 55/228; B60T 7/08; B60T 7/10; B60T 7/102; B60T 11/18; B60T 11/22; B60T 13/142; B60L 1/00
USPC ........................................................ 188/344
See application file for complete search history.

(56) References Cited

U.S. PATENT DOCUMENTS

| | | | |
|---|---|---|---|
| 6,883,647 B1 * | 4/2005 | Wen | B62M 25/08 188/344 |
| 2006/0071542 A1 * | 4/2006 | Lichtensteiger | B62L 3/06 188/344 |
| 2013/0069355 A1 * | 3/2013 | Gohr | B60T 7/104 280/771 |
| 2013/0192941 A1 * | 8/2013 | Lin | B60T 7/102 188/344 |
| 2016/0368560 A1 * | 12/2016 | Barnett | B60T 7/102 |
| 2018/0354579 A1 * | 12/2018 | Barnett | B62L 3/023 |

* cited by examiner

*Primary Examiner* — Robert A. Siconolfi
*Assistant Examiner* — San M Aung
(74) *Attorney, Agent, or Firm* — Diament Patent Law, P.C.; Adam Diament

(57) ABSTRACT

A brake master cylinder assembly with adjustable fluid reservoir. The invention prevents air from entering a motorcycle hydraulic brake line by adjusting the fluid reservoir to be level with the ground of motorcycle operation. The brake handle remains parallel with the relative position of the handlebar the assembly is fastened to. All motorcycle brake master cylinders have a fluid reservoir and hydraulic piston that are in a fixed position relative to the handle and handlebar. The invention has a reservoir assembly which may be adjusted to any angle to keep the fluid reservoir level while the motorcycle is upright; allowing the motorcycle to have a brake handle and corresponding handlebar at any angle desired. The adjustable hydraulic fluid reservoir assembly prevents air from entering the brake line by reducing exaggerated angles incorporated with handlebar positions. The overall brake performance is therefore extended, mitigating risks' and extending service life.

1 Claim, 7 Drawing Sheets

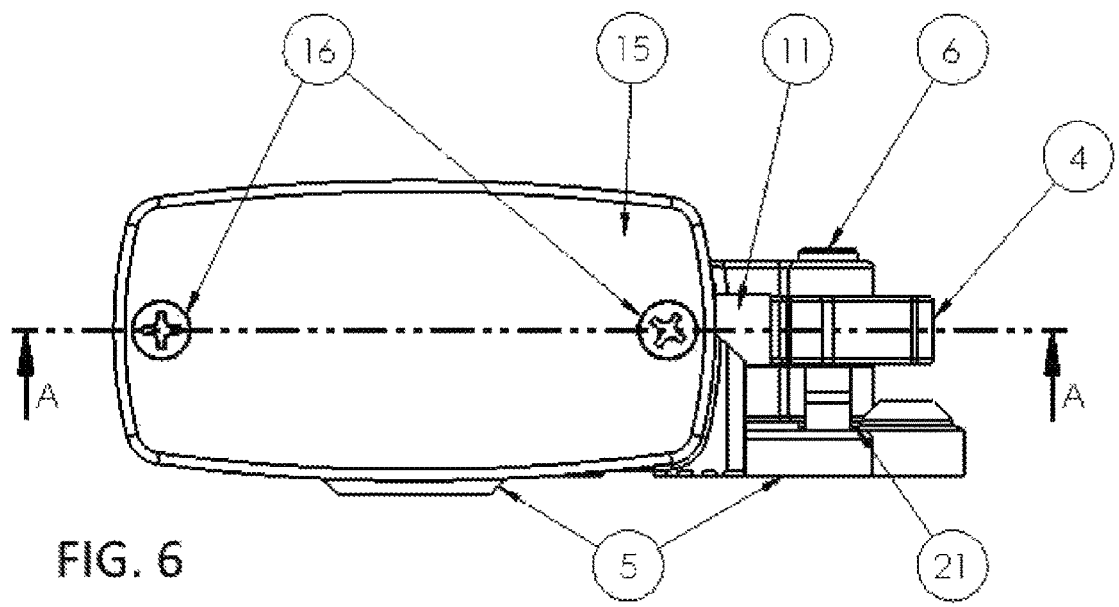
FIG. 6
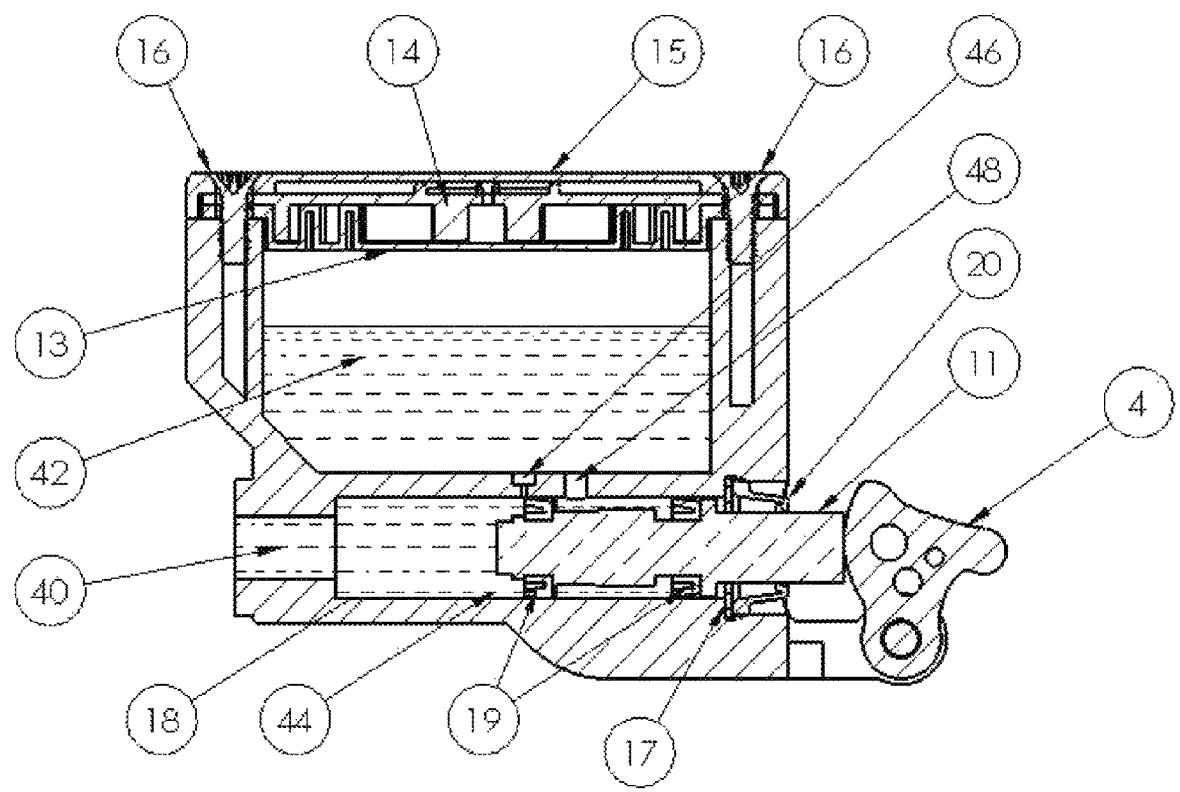
FIG. 7    SECTION A-A
SCALE 1:1

BRAKE MASTER CYLINDER

BACKGROUND OF THE INVENTION

The invention prevents air from entering a hydraulic piston brake line. The invention described here solves a known motorsports hydraulic braking problem. Brake master cylinders for front braking on motorcycles are mounted on the handlebars. Handlebars have many different angles. The brake hydraulic fluid is inside the brake master cylinder. With various angles of handlebars and turning angles, air can be forced into the brake line causing unwanted loss of fluid pressure. This invention allows the user to mount the brake master cylinder to the handlebar and adjust the reservoir so the fluid is level with the ground while the motorcycle is upright, similar to a steady state riding position. By having the fluid reservoir level with the ground, air is not able to enter the orifices to the piston. Therefore, by having an adjustable hydraulic fluid reservoir, the invention eliminates loss of braking pressure.

This invention mitigates an existing flaw in hydraulic braking. The invention prevents air from entering brake lines by having an adjustable fluid reservoir. The invention also uses an additional link for power application, no matter the angle of the reservoir, the braking handle stays in line with the handlebars of the motorcycle.

Hydraulic brake systems are meant to have level reservoirs so air may not enter the closed system. For various reasons, motorcycles may have handlebars at steep angles. All existing hydraulic brakes will have fluid reservoirs in line with the handlebar they are mounted to. This means the level of fluid inside the reservoir has a greater chance of allowing air to reach the orifices. Once air enters the system, a service must be performed to remove the air. A rider who postpones servicing is more likely to experience brake loss. Brake loss is a matter of safety. This invention extends the life of servicing, therefore increasing performance over time and mitigating risk.

BRIEF DESCRIPTION OF THE DRAWINGS

FIG. 6 illustrates a top view of the brake master cylinder assembly fluid reservoir with a section A-A cut detail according to an embodiment of the invention;

FIG. 7 illustrates a front view of section A-A cut detail of brake master cylinder assembly fluid reservoir, piston, and driver link according to an embodiment of the invention;

THE INVENTION INCLUDES COMPONENTS

Figure 1:
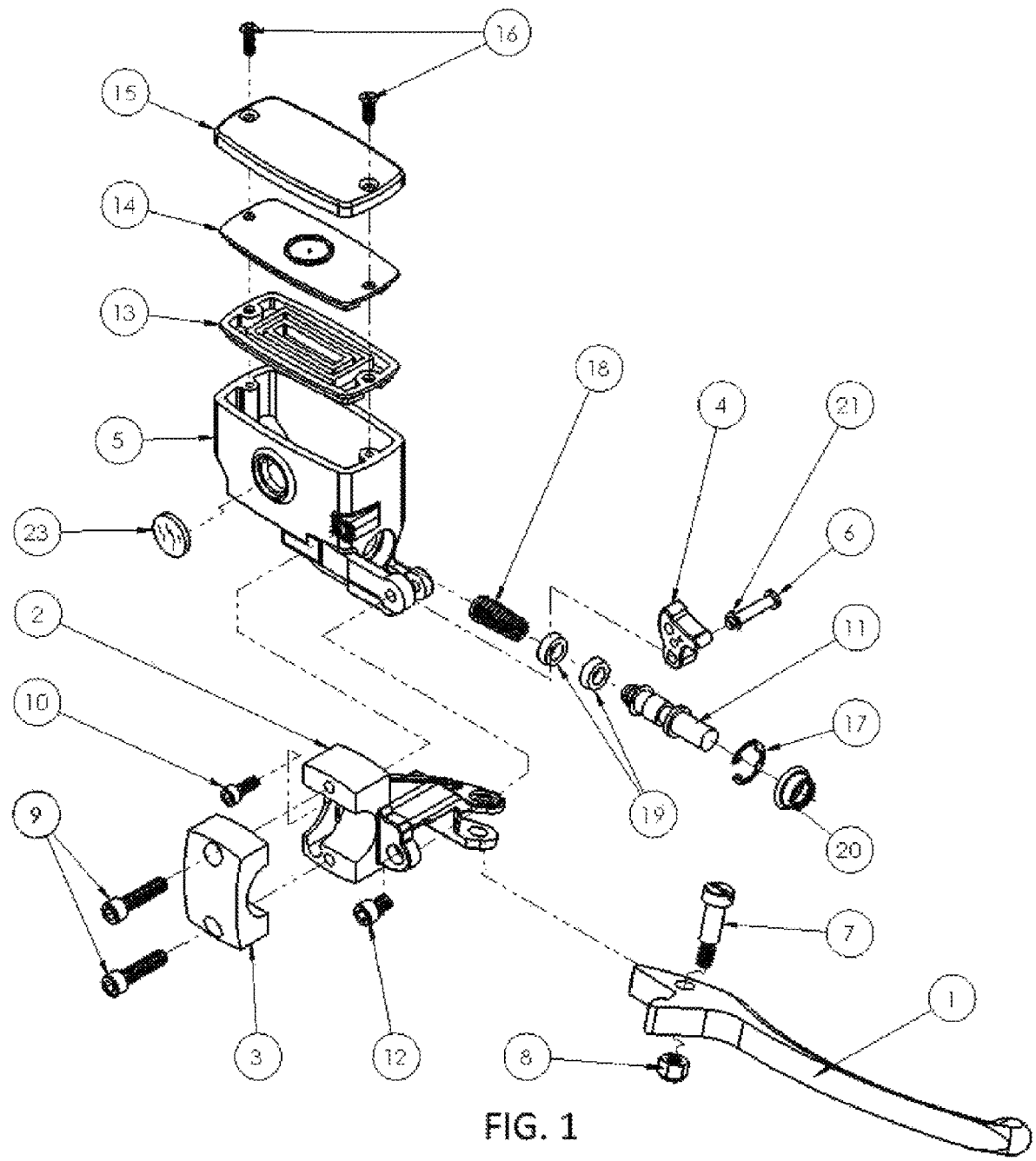
FIG. 1 illustrates an exploded perspective view of the brake master cylinder assembly according to an embodiment of the invention.
Figure 2:
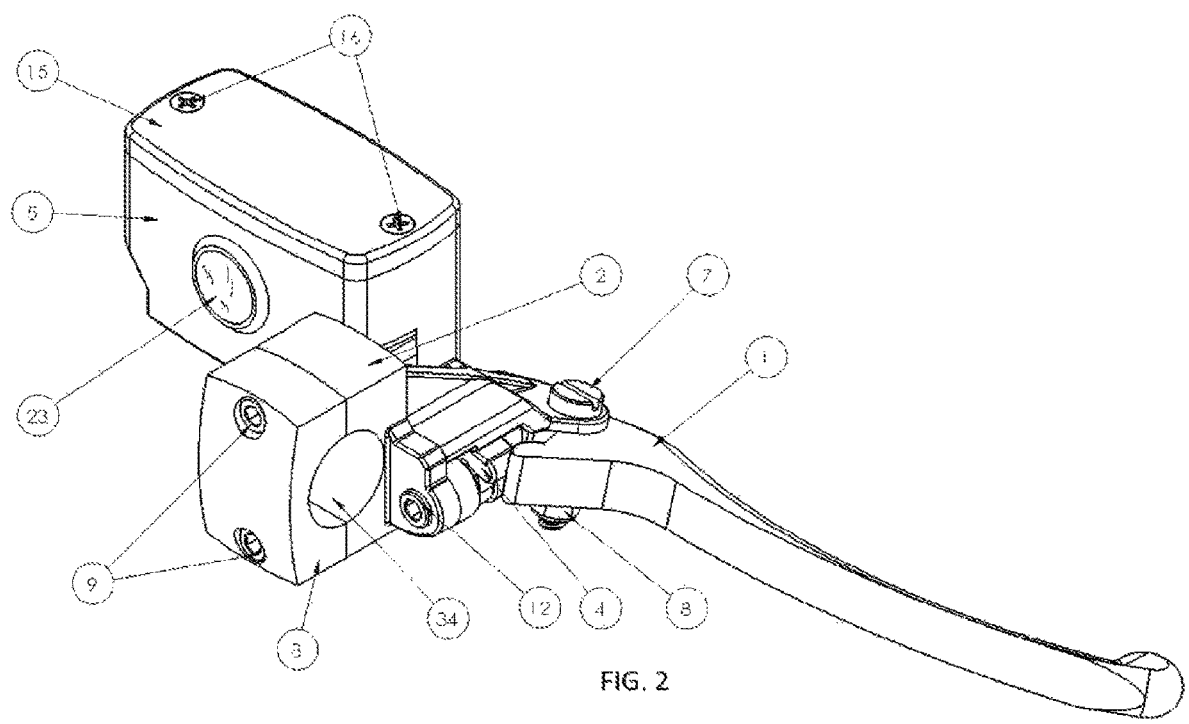
FIG. 2 illustrates an isometric front view of the brake master cylinder assembly with the reservoir traditionally aligned with the handle according to an embodiment of the invention.
Figure 3:
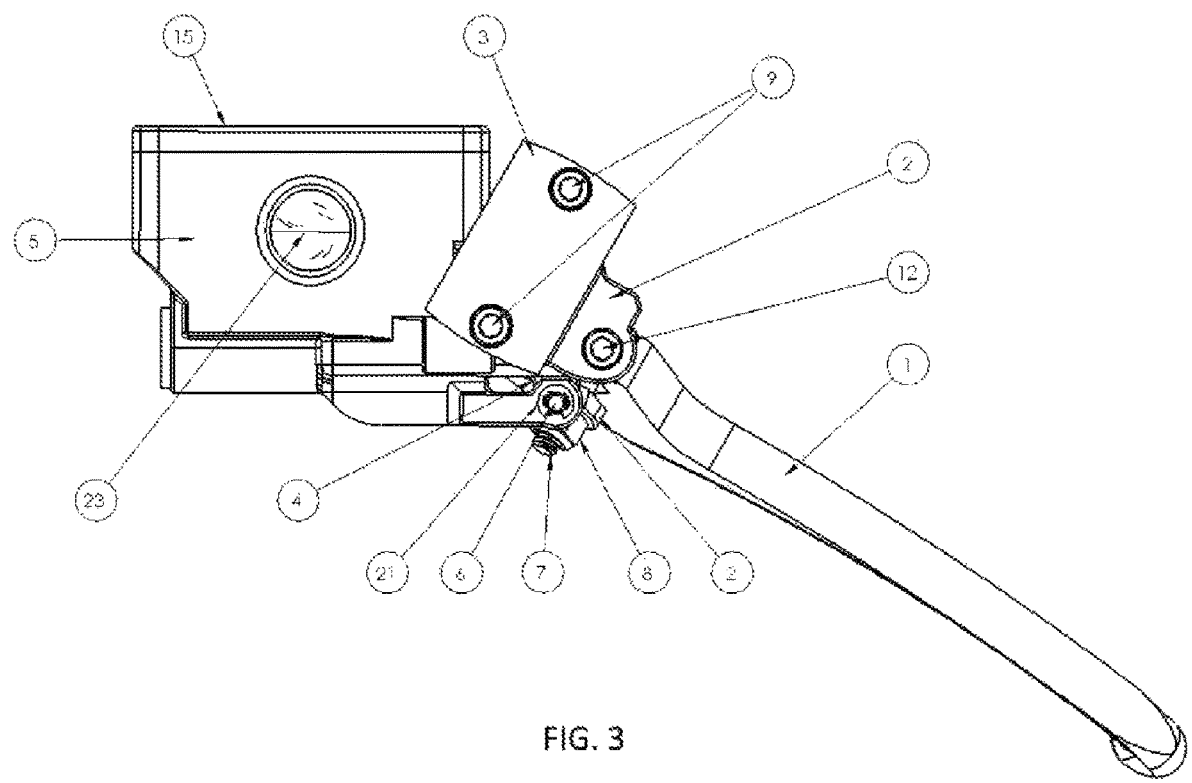
FIG. 3 illustrates a front view of the brake master cylinder assembly with the fluid reservoir angled with respect to the handle and base bracket according to an embodiment of the invention.
Figure 4:
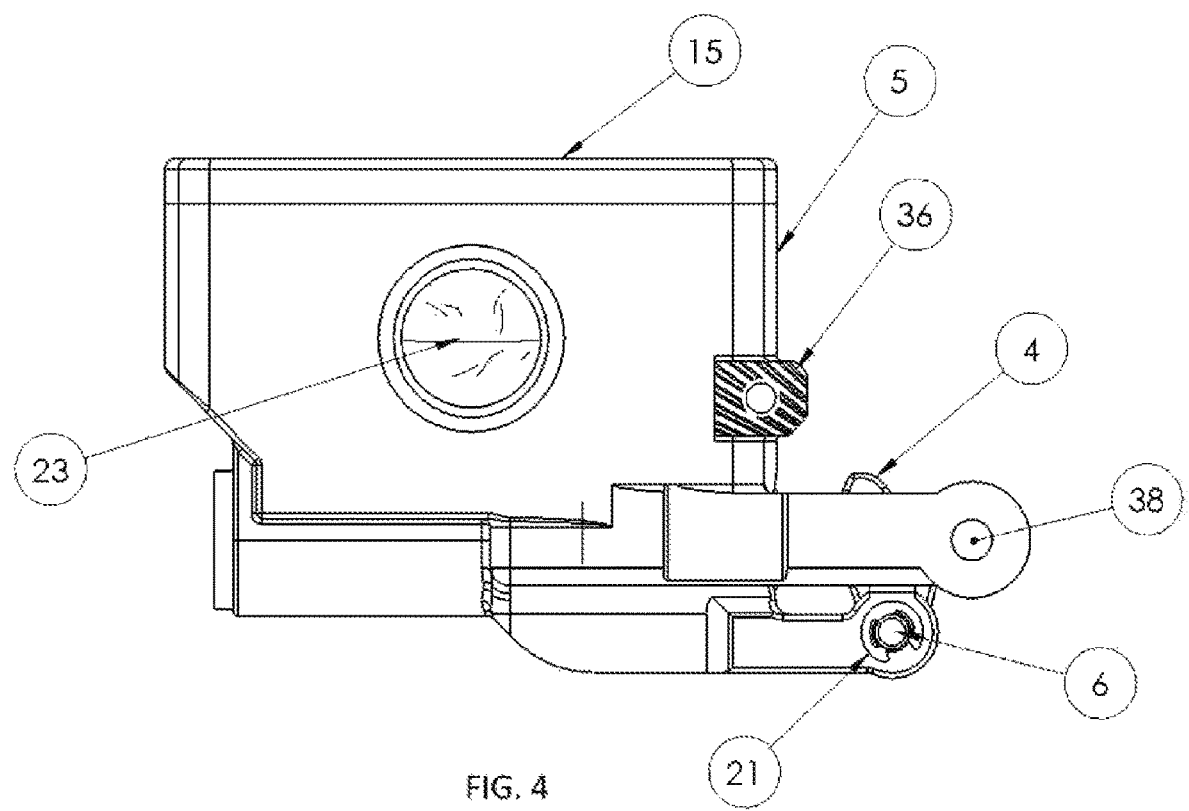
FIG. 4 illustrates a front view of the brake master cylinder assembly fluid reservoir and driver link according to an embodiment of the invention.
Figure 5:
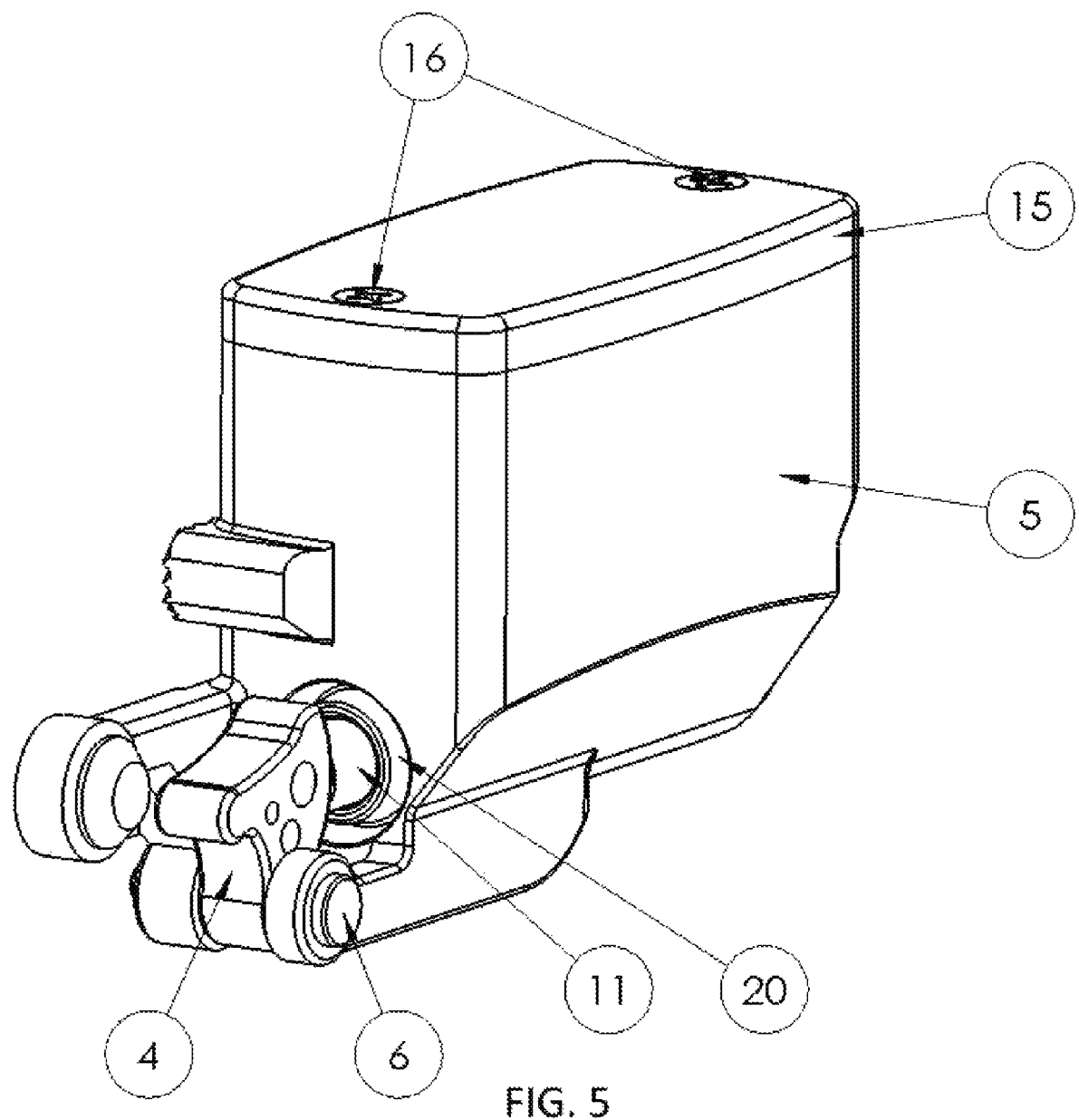
FIG. 5 illustrates an isometric rear view of the brake master cylinder assembly fluid reservoir and driver link according to an embodiment of the invention.
Figure 8:
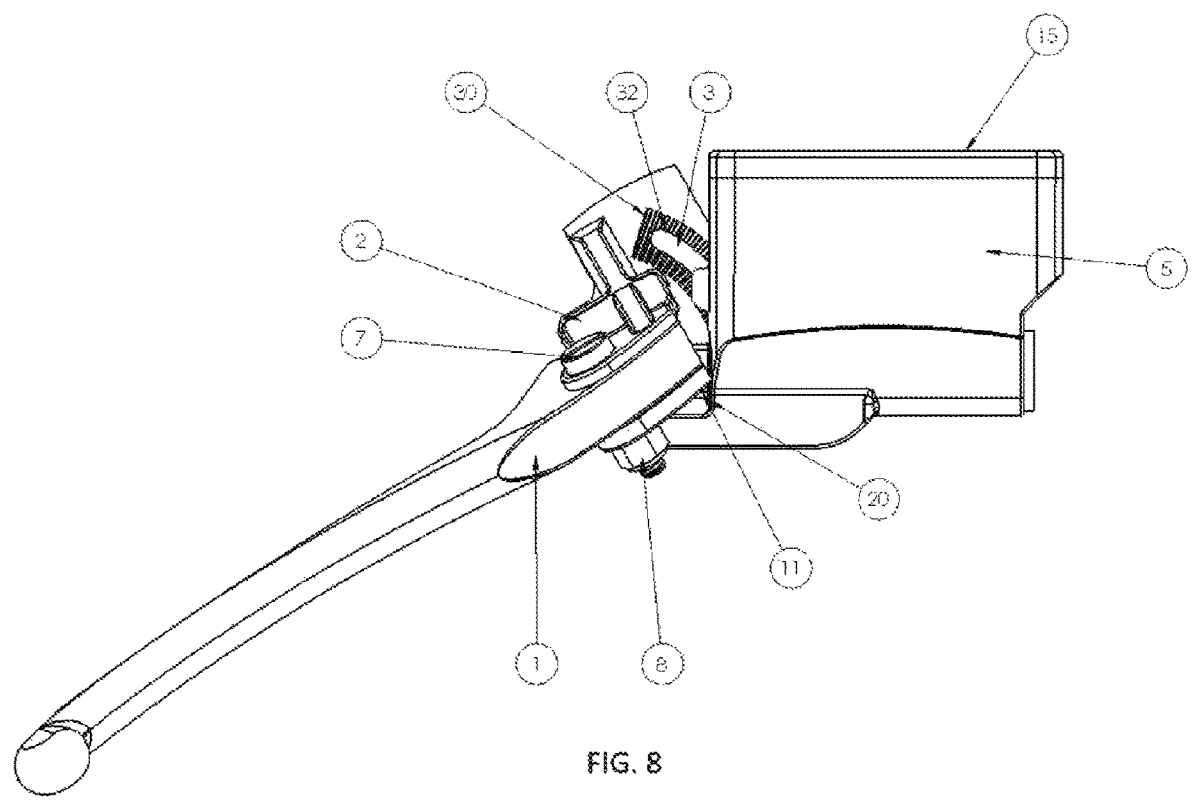
FIG. 8 illustrates a rear view of the brake master cylinder assembly according to an embodiment of the invention.

1. Handle
2. Base Bracket
3. Cover Bracket
4. Driver Link
5. Reservoir Body
6. Clevis Pin
7. Shoulder Screw
8. Locking Nut
9. Cover Bracket Machine Screw
10. Positioning Machine Screw
11. Piston
12. Axis Machine Screw
13. Diaphragm
14. Diaphragm Support
15. Cover Plate
16. Cover Plate Machine Screw
17. Retaining Ring
18. Compression Spring
19. Compression Gasket
20. Shaft Seal
21. Clevis Pin C Clip
23. Sight Glass
30. Circular Groove Pattern
32. Circular Slotted Through Hole
34. Handlebar Slot
36. Reservoir Body Mating Groove Pattern
38. Axis of Rotation
40. Hydraulic Brake Line Connection
42. Hydraulic Brake Fluid Reservoir
44. Cylinder Bore
46. Forward Hydraulic Fluid Orifice
48. Aft Hydraulic Fluid Orifice Relationship Between Components:

Item 16 is used to fasten Items 13, 14, and 15 to the item 5 in the order referenced in the exploded view. Item 23 is press fit to item 5 to see a hydraulic brake fluid level inside item 5. A small assembly of items 18, 19, and 11 are first assembled then inserted into the lower portion of item 5 in item 44. This would be described as a small spring-loaded piston assembly being inserted into a cylinder bore. The piston assembly is held in place in item 5 with item 17. Once in place item 20 is inserted over item 11 and held in place with the body of item 5 for sealing purposes. Item 18 will move linearly in item 44 in conjunction with items 11 and 19 respectively. After the small assembly has been inserted item 6 is used to fasten item 4 to item 5 and secured with item 21. Item 2 is secured to item 5 with two fasteners items 10 and 12. Item 12 is for fastening of the two items 2 and 5 about item 38 which is an axis of rotation. Item 10 is used to fasten items 30 and 36 tightly through item 32 so items 2 and 5 will remain statically held in a single position while secured. Item 3 is fastened to item 2 with item 9. Item 1 is held in place to item 2 with item 7 and 8. Item 1 rotates about item 7 to engage a force from item 1 to item 4 which then engages a force on item 11 in the piston assembly in item 5. Item 11 acts linearly in item 44 which opens and closes the items 46 and 48. Item 2 and 3 will engulf and secure the entire assembly of parts to a handlebar or an elongated object in item 34.

How the Invention Works:

The idea of the invention is to adjust a motorcycle brake master cylinder fluid reservoir and piston assembly so the internal hydraulic brake fluid of item 42 in item 5 is level with the ground while the motorcycle is upright. The entire assembly of parts is fastened to a handlebar or elongated shaft through item 34. Items 2 and 3 together make item 34 and are held together with item 9. Items 1, 2, and 3 are all major components that are statically mounted to said provided handlebar or elongated shaft in item 34. The entire item 5 is adjustable about item 38, and secured in place by items 10 and 12 respectively. Item 4 is attached to item 5 with item 6 and secured in place with item 21. Item 1, which is held in place with items 7 and 8; rotates about item 7 to rotate item 4. Item 1 is in contact with item 4 which is then in contact with item 11. Item 1 will be in parallel with the handlebar or elongated shaft in item 34. Item 5 can be rotated about item 38 and the entire piston assembly in item 44 functions regardless of the secured position and angle between item 5 and item 2. The piston assembly moves linearly within item 44 and item 5 respectively in any relative position to item 2 given they are fastened with items 10 and 12. Ideally, the hydraulic brake fluid level in item 5 and item 42 will be approximately level to the ground of the associated motor or electric vehicle to which this assembly is mounted to and used. Item 12 is mated through item 32 which secures items 30 and 36. Items 10 and 12 secured in place while items 30 and 36 are secured in place by means of item 10 through item 32 and item 12 through item 2 secured to item 5, will yield a static position of item 5 relative to item 2. Item 10 along with item 12 can be unsecured; item 10 will travel along the circular groove of item 32 until secured in place by items 30 and 36. The hydraulic brake fluid in item 5 is an incompressible fluid which will only fill to the center of item 23. Item 23 allows the user to see the hydraulic fluid level while items 13, 14, and 15 are fastened by item 16. Item 5 will also contain the compressible fluid of air along with the incompressible hydraulic brake fluid between item 13 acting as a seal while expanding and contracting to accommodate the volumetric change in item 42 with respect to the position of item 11 and 19 in item 44. Item 14 is a support for item 13 along with being a protective layer from item 15. The user must squeeze or pull item 1 with their hand or limb to engage the entire assembly in order to increase the hydraulic brake fluid pressure in items 40 and 44. Item 40 is where any brake line connection is assembled to item 5 which accommodates a full hydraulic braking system on motor vehicles and electric vehicles. The rotating protruding face of item 1 rotates item 4 contact face to linearly move item 11 encased in item 5 and item 44. Item 11 is minimally held in position with item 17 and sealed with item 20. Item 20 is a seal for the piston assembly linear movement so debris may not enter the closed system in item 44. Item 11 has a first item 19 aft of item 48 while at minimum position. Item 11 has a second item 19 aft of item 46 while at minimum position. Ideally, the area between said item 20 and first said item 19 will consists of a compressible fluid of air. Additionally, ideally, the area in item 44 forward of first said item 19 will consists of hydraulic brake fluid. During the linear movement of item 11 the hydraulic brake fluid in item 40 increases; during this process item 46 is separated from item 44 and item 42. Both item 46 and 48 will experience a change in pressure during the movement of items 11 and 19. Item 13 will expand and contract to accommodate the volumetric change and pressure variations in item 42. Once the user lets go or no longer pulls item 1, item 18 will return the entire assembly to its minimum position. The minimum position for item 11 is held by item 17.

How to Make the Invention:

Items 1, 2, 3, 4, 5, and 15 are cast out of metal by method of either sand casting or permanent mold casting. Scrap material is cut away from the originally cast parts. The items 1, 2, 3, 4, 5, and 15 are machined on a mill to accommodate all drill holes and taps. They are then coated if necessary, to protect from environmental corrosion. The items 6, 21, 7, 8, 16, 10, 12, and 17 can be made out of metal alloy by methods of forging and or machining steel alloys. Item 18 more specifically is forged from spring steel and coated. Items 19, 20, and 13 are injection molded from elastomer or rubber material. Item 11 is machined from a rod of brass-based alloy. Item 14 can be produced by either 3D printing or injection molded plastic. Item 23 is an acrylic based clear plastic that can be cut from water jet or a hole saw.

All Items are then Assembled as Follows:

Item 23 is press fit into item 5. Two of said item 19 will be press fit onto item 11. Item 18 will then be press fit onto the end of item 11. The items 11, 18 and 19 will then be inserted into item 5 in the area of item 44 and held in place by item 17. Item 20 will be press fit over the aft end of item 11 until it touches the outer face of item 17. Item 4 will be secured to the outer arms of item 5 with item 6 and item 21. Item 4 should be rotated to be touching item 11. Item 13 is first placed on top of item 5. Item 14 is placed on top of item 13. Item 15 is placed over item 14 and secured with item 16. Item 2 is secured to item 5 with items 10 and 12. Once item 2 is in a secured position, item 1 is inserted into the end of item 2 and secured in place with item 7 and 8. Item 3 is fastened to item 2 with item 9. With the exception of item 20, all items are necessary. Item 20 allows for the closed system of the piston to work better by eliminating debris and preventing corrosion.

How to Use the Invention:

A person with a motor vehicle or an electric vehicle with a hydraulic braking system on the handlebars would use this invention by installing this brake master cylinder on the handlebars of their vehicle. Prior to the item 3 being fastened to the item 2 with item 9, items 10 and 12 are loosened. The user should position the motorcycle upright to simulate a level riding position. The item 5 should be rotated to be level with the ground the vehicle is on. Once the item 34 is in line with the handlebar and item 5 is level with the ground or platform the vehicle is on, items 10 and 12 are secured or tightened. Item 9 then will be used to mount the entire assembly to the handlebar with item 3 secured to item 2. Items 16, 15, 14, and 13 are temporarily removed after the assembly is mounted to the handlebars. The area of item 42 is filled with hydraulic brake fluid to the center of item 23. The process of opening the end of the attached braking system and bleeding the brake line to alleviate any air is then preformed. This is done by pumping the brake lever item 1 and adding hydraulic brake fluid to item 5. Additional hydraulic brake fluid will be added until the entire brake assembly is filled with hydraulic brake fluid through item 40. The user should ensure that the fill line after servicing stops at the center of the item 23. The items 13, 14, and 15 are then installed and secured by item 16.

Additionally, This invention allows for the moving of a system of constant change in angle to accommodate a hydraulic system that has a master cylinder that has both air and hydraulic fluid. It allows the user to set the reservoir angle to be most advantageous for the intended use of the system. This could be used in equipment that may be set at an angle other than level to the ground.

I claim:

1. A brake assembly comprising:
a base bracket coupled to a master cylinder housing by an orientation axis;
a rotating handle coupled to the base bracket;
a rotating driver link coupled to a master cylinder assembly comprising a cylinder housing a piston comprising a pushrod; and
the rotating driver link configured to compress the pushrod rotating about an axis as the handle is advanced towards the driver link;
wherein the rotating handle is capable of being set at a variety of angles with respect to the master cylinder housing without changing a horizontal positioning of a reservoir body to a handlebar; and,
wherein the rotating handle is configured to advance the rotating driver link at a variety of angles set between the base bracket and the master cylinder housing by securing the master cylinder housing to the base bracket via a supporting configuration of circular groove patterns.

* * * * *